United States Patent [19]
Charhut

[11] 4,451,049
[45] May 29, 1984

[54] FACE SEAL

[75] Inventor: Frank J. Charhut, Northfield, Ill.

[73] Assignee: Chicago-Allis Mfg. Corp., Chicago, Ill.

[21] Appl. No.: 375,397

[22] Filed: May 6, 1982

Related U.S. Application Data

[62] Division of Ser. No. 159,808, Jun. 16, 1980, abandoned.

[51] Int. Cl.³ .............................................. F16J 15/34
[52] U.S. Cl. ........................................ 277/42; 277/88; 277/89
[58] Field of Search ...................... 277/42, 88, 89, 90, 277/41

[56] References Cited

U.S. PATENT DOCUMENTS 2,717,790  9/1955  Chambers et al. ..................... 277/42
3,018,112  1/1962  Amirault et al. ...................... 277/42

FOREIGN PATENT DOCUMENTS 785665  10/1957  United Kingdom ................. 277/42

Primary Examiner—Robert I. Smith
Attorney, Agent, or Firm—Martin Faier

[57] ABSTRACT

A face seal cartridge assembly of predetermined working height tolerance for sealing a rotatable shaft in a fluid filled housing, wherein the face seal assembly comprises connected stator and rotor portions and one of these portions has an axial flexing membrane of resilient material secured therein for equalizing dynamic cyclical shaft motion.

7 Claims, 4 Drawing Figures

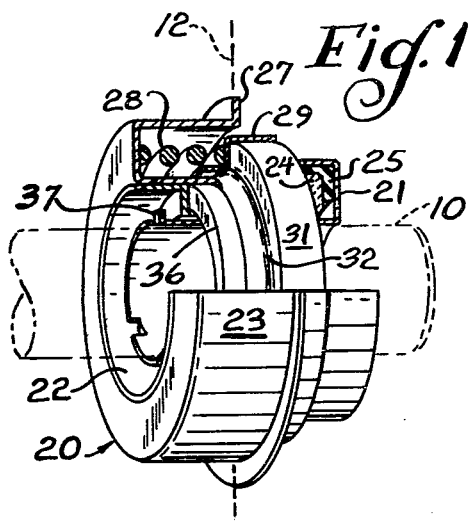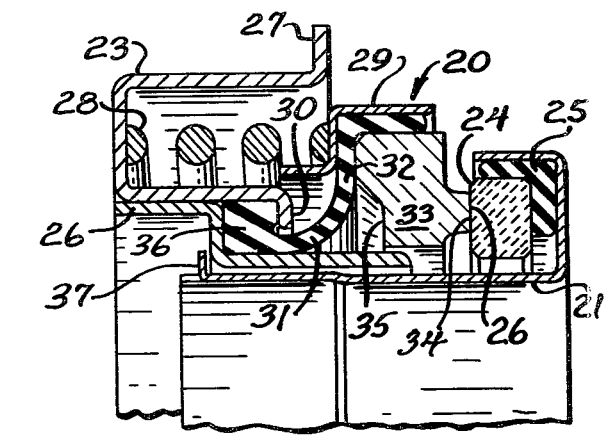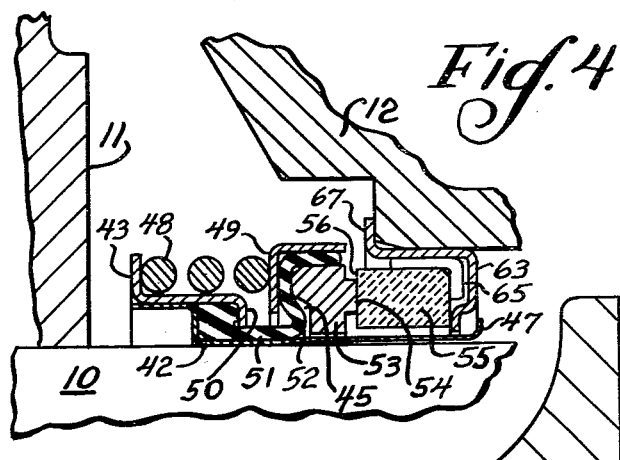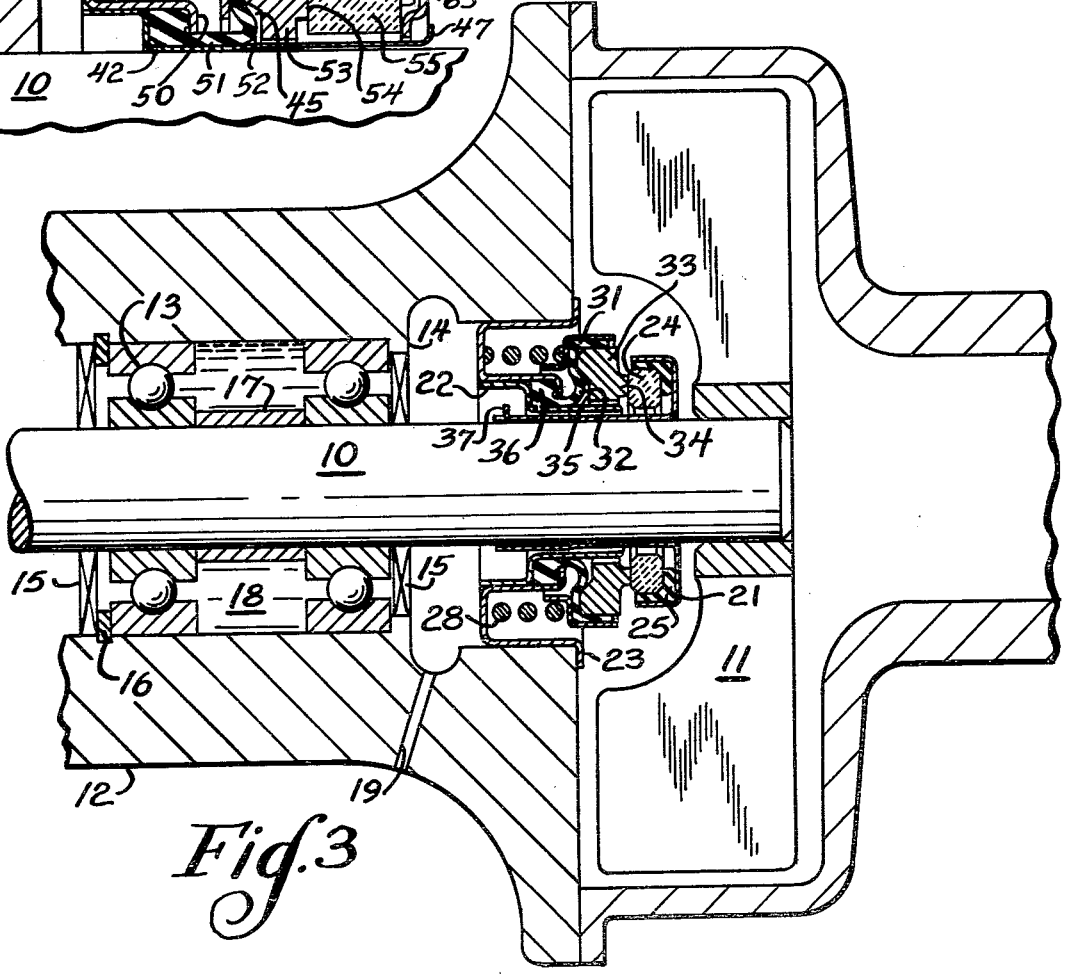

FACE SEAL

This is a division of application Ser. No. 06/159,808, filed June 16, 1980, and now abandoned.

BACKGROUND AND SUMMARY OF THE INVENTION

This invention relates to a unitized face seal assembly and is more particularly directed to such an assembly which is fabricated into one piece and which includes an axial flexing membrane.

A face seal assembly of the kind embodying the present invention may be press fit over a rotatable shaft, and into the bore of a housing in a prepositioned posture, and is particularly useful in sealing a rotatable shaft carrying an impeller which has been fit thereon within a fluid filled housing, as in a diesel engine water pump.

Most conventional seals are formed with drive lugs, which prevent rotation of the static mating face of the seal, but when such a construction is utilized in a seal environment characterized by relatively slow rotation of a crank shaft, as in a diesel engine, cyclic or harmonious rotation of the crank shaft often causes premature failure of the seal, particularly where the shaft is gear driven. By eliminating these drive lugs, the life of the seal may be substantially extended, provided the seal assembly includes means for accommodating dynamic axial deflection of the rotating shaft.

In the present invention, the unitized cartridge assembly comprises the rotor portion of the seal, press fit over the rotatable shaft and has a first annular ring having a sealing face which is resiliently secured in the cartridge mounted for rotation with the shaft, and the stator portion of the seal, consisting of a second annular ring having a sealing face biased in face to face abutment with the sealing face of the first annular ring and is press fit within the bore of the static housing. An integral inner ring holds the annular collar and one of the annular rings, and a spring held within an annular collar is provided for urging one of the sealing faces in abutment with the other sealing face. Tabs formed on the cartridge wall prevent removal of the stator portion from the rotor portion of the assembly. The annular rings may be fabricated from ceramic and carbon materials. A novel resilient annular membrane molded of flexible material, such as rubber, is provided to maintain sealing relation even under dynamic forces caused by cyclic rotation of the shaft, and this membrane is constructed so that its nose piece may be securely grasped in one of the seal portions without inhibiting flexing of its bellows portion, the bellows portion being formed and seated in a predetermined position to accommodate torque movement of the shaft without causing stress on the membrane during its working life. This arrangement requires seal construction to a very exact working heighth tolerance. The seal embodying the invention may be fabricated with this novel membrane on either its stator or rotor portions.

OBJECTS AND ADVANTAGES OF THE INVENTION

It is an object of the invention to provide a face seal cartridge assembly of the character referred to.

Another object of the invention is to provide a unitized face seal assembly having means for equalizing dynamic cyclical shaft motion during its rotation.

Another object is to provide an axial flexing membrane for a face seal assembly.

Another object is to provide a face seal assembly having means to maintain an axial flexing membrane in a predetermined position.

Another object is to provide a face seal assembly of predetermined exact working height.

Another object is to provide a cartridge face seal assembly which is not difficult to manufacture or use, which may be fabricated and utilized with great predictability, and which is easy to install and has a long and efficient working life.

These and other objects and advantages of the present invention will become more apparent with reference to the following description of a preferred embodiment and the appended drawings.

BRIEF DESCRIPTION OF THE DRAWINGS

In the drawings:

FIG. 1 is a perspective view of a face seal embodying the present invention, with a portion of its cartridge broken away to show the interior thereof, and with the rotatable shaft and the housing shown in broken lines.

FIG. 2 is a detailed sectional view of part of the face seal, showing the flexible membrane in relaxed position mounted in the stator portion.

FIG. 3 is a sectional view of the face seal embodying the invention secured on a rotatable shaft and within a housing, showing the seal in working position.

FIG. 4 is a detailed sectional view, similar to FIG. 2, showing a modified seal in which the flexing membrane is secured in the rotor portion.

DESCRIPTION OF A PREFERRED EMBODIMENT

A shaft 10 carries an impeller 11 secured on one end thereof within a housing 12. The shaft 10 may be mounted on bearings 13 fit against a step 14 in the bearing bore and sealed therein by means of lip seals 15 on both ends thereof. A snap ring 16 may be provided in the bearing bore, and a ring 17 may hold the bearings 13 spaced apart, the peripheral area 18 between the bearings 13 being grease filled. A drain passage 19 may be provided in the shaft housing 12 to vent to atmosphere the space between the seals and act as a weephole in the event of either seal leaking.

With reference to the illustrative embodiment shown in FIGS. 1-3, the unitized cartridge seal 20 has a rotor body 21 interlocked with a stator body having an inner annular ring 22 and an outer collar 23 integrally connected therewith. Within the rotor body 21 is a first annular sealing ring 24 which may be fabricated from ceramic material, mounted in working position by a flanged annular resilient washer 25 which rotates with the shaft 10, so that the sealing face 26 of the first ring 24 is presented to the stator portion of the seal in a manner to be described.

The outer collar 23 of the stator body has a peripheral flange 27 dimensioned for press fitting within the bore of the housing 12, and a spring 28 is biased therein for bearing against an inner collar 29. Secured between the inner annular ring 22 and a flange 30 on the outer collar 23 is a flexible membrane 31 which has a bellows portion 32 seated in the inner collar 29 over a second annular sealing ring 33, which may be fabricated from carbon and which has a sealing face 34 abutting the sealing face 26 of the first ring 24 in face to face relation. The second sealing ring 33 is formed with a recess 35 providing space for controlled flexing of the bellows portion 32 of the membrane 31. The secured portion 36 of the membrane 31 is of substantial cross-section as to provide means for securely holding the membrane without affecting the resiliency of the bellows portion 32. The stator portions of the seal 20 are prevented from separating from the rotor body 21 by means of tabs 37 struck therefrom which stop the inner annular ring 22.

In the modified unitized cartridge seal shown in FIG. 4, the rotor portion has an inner annular ring 42 which is press fit on a shaft 10 carrying an impeller 11 and which is secured to an annular collar 43 against which one end of a spring 48 bears, the other end of said spring bearing against an inner collar 49. A flange 50 on the annular collar 43 and the inner ring 42 secures a flexible membrane 51 in the rotor portion and this membrane has a flexible bellows 52. The spring 48 biases a first sealing ring 53, having a sealing face 54 of the rotor against a second sealing ring 55, having a sealing face 56, of the stator portion and this first sealing ring has a recess 45 into which the membrane bellows 52 may flex. The stator sealing ring 55 is seated in a stator collar 63 and cushioned therein by resilient washer 65. Peripheral margins 67 of the stator collar 63 may be press fit into a bore in a housing 12 and the stator-rotor portions may be maintained interlocked together by means of tabs 47 struck from the inner annular ring 42.

Unitized cartridge face seals embodying the present invention provide for substantial axial deflection of the shaft 10 relative to the housing 12, which often results from cyclic crank shaft motion. This accommodation for axial deflection is provided by means of the novel construction and positioning of the membrane 31 within the seal. The seal construction permits dampering substantially as great as nonunitized multipieced seals, and permits engineering of minimum working height tolerance into the seal and its environment.

Prepositioning of the seal within a predetermined working heighth tolerance, i.e. the designed space between the surface of the housing 12 at its bore and the end of the seal rotor portion 21, which is maintained at less than the free heighth and greater than the solid heighth of the seal, is critical, as that dimension essentially relates to the flexing of the bellows 32 or 52 of the membrane 31 or 51 thereby controlling the extent of torque and axial deflection applied to the seal. This sealing arrangement embodying the present invention, which is not dependent on the relative position of the impeller and housing but only on the position of the housing to the placement point of the seal on the shaft, may be utilized on seals where the novel membrane is secured in the stator portion of the seal, as shown in FIGS. 1-3, or in the rotor portion of the seal, as shown in FIG. 4.

Mating sealing faces are maintained stable and nonrotating relative to their respective holding members. The shape, position and securement of the membrane provides controlled flexing in minimum travel of the membrane bellows, thus allowing relatively stressless flexing within the working heighth tolerance.

Many changes and modifications may be made in the illustrative face seal assembly without departing from the nature and spirit of the invention. Therefore, it is not desired that the scope of this invention be limited to the exact construction disclosed in this application.

I claim:

1. In a face seal cartridge assembly for sealing a rotatable shaft in a fluid filled housing, said assembly consisting of a rotor portion for securement on said shaft and a stator portion for securement in said housing, said portions being connected together in a unitized arrangement, said assembly adapted for compressible positioning in said housing on said shaft within a designed working heighth tolerance dimension, each portion having a sealing face, the sealing face of one portion being in face to face abutment with the sealing face of said other portion, the sealing face of said one portion being carried by an annular sealing ring having an annular recess therein, a resilient membrane contained within said one portion adapted for flexing within said dimension, spaced apart holding means maintaining said membrane within said dimension, one end of said holding means having first collar means securing one end of said membrane, the other end of said holding means having second collar means engaging the other end of said membrane over said sealing ring, a spring arranged between and having an end bearing on each of said collar means, each end of said holding means being free to move axially responsive to an axial deflection of the shaft relative to the housing, and a deformable bellows on said membrane between the ends of said holding means retained folded and adapted for flexing into said recess within said dimension for taking up and dampening torque transmitted from said sealing faces during rotation of said rotor portion relative to said stator portion.

2. The face seal cartridge assembly recited in claim 1, wherein said second collar means and the other end of said membrane is arranged outwardly radially from said first collar means and the surfaces of said membrane engaged therein.

3. The face seal cartridge assembly recited in claims 1, wherein said membrane is of substantially greater cross-section where it is secured in said first collar means than where said membrane is free of said securement.

4. The face seal cartridge assembly recited in claim 2, wherein said collar means each carry a flange, a flange of one of said collar means being disposed parallel to the flange of said other collar means, and said spring is received between and slideably mounted on and between said flanges, said spring being arranged in a plane parallel to the longitudinal axis through said assembly pressing said one portion sealing face flush against said other portion sealing face and remote and spaced apart from said bellows and said recess.

5. The face seal cartridge assembly recited in claim 1, wherein said other portion has a body extending axially beyond said sealing faces and said membrane.

6. The face seal cartridge assembly recited in claim 5, wherein said other portion extension body has radial tabs struck therefrom in the direction of said first portion for rotatably seating said other portion within said first portion in interlocked unitized relation.

7. The face seal cartridge assembly recited in claim 1, wherein said first portion comprises the rotor portion of said assembly.

* * * * *